United States Patent
Cao et al.

(10) Patent No.: US 8,837,263 B1
(45) Date of Patent: Sep. 16, 2014

(54) AUTOMATIC ON-DRIVE SYNC-MARK SEARCH AND THRESHOLD ADJUSTMENT

(71) Applicant: LSI Corporation, San Jose, CA (US)

(72) Inventors: Rui Cao, San Jose, CA (US); Haitao Xia, San Jose, CA (US); Yu Kou, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/850,942

(22) Filed: Mar. 26, 2013

Related U.S. Application Data

(60) Provisional application No. 61/804,515, filed on Mar. 22, 2013.

(51) Int. Cl.
  *G11B 20/20* (2006.01)
  *G11B 27/30* (2006.01)
(52) U.S. Cl.
  CPC .................... *G11B 27/3027* (2013.01)
  USPC ........................................................ 369/47.28
(58) Field of Classification Search
  None
  See application file for complete search history.

(56) References Cited

U.S. PATENT DOCUMENTS

| | | | | |
|---|---|---|---|---|
| 7,561,649 | B2* | 7/2009 | Ashley et al. | 375/365 |
| 7,733,590 | B2* | 6/2010 | Motwani | 360/51 |
| 7,881,164 | B1* | 2/2011 | Han et al. | 369/44.11 |
| 7,974,034 | B1* | 7/2011 | Han et al. | 360/51 |
| 8,345,369 | B2* | 1/2013 | Xia et al. | 360/51 |
| 8,564,897 | B1* | 10/2013 | Yang et al. | 360/39 |
| 2007/0172008 | A1* | 7/2007 | Shine | 375/368 |
| 2010/0115209 | A1* | 5/2010 | Lee et al. | 711/154 |
| 2011/0292535 | A1* | 12/2011 | Haratsch et al. | 360/51 |
| 2012/0106607 | A1 | 5/2012 | Miladinovic et al. | |
| 2012/0120784 | A1* | 5/2012 | Yang et al. | 369/107 |
| 2012/0236428 | A1* | 9/2012 | Xia et al. | 360/32 |

* cited by examiner

*Primary Examiner* — Brenda Bernardi
(74) *Attorney, Agent, or Firm* — Suiter Swantz pc llo

(57) ABSTRACT

A hard disk drive includes a processor to automatically adjust a threshold level for finding sync-marks. The processor determines all possible sync-mark patterns for a particular pattern length and analyzes each pattern with reference to real world data. The pattern with the largest distance gap is used. The threshold level is then adjusted dynamically to produce the lowest possible failure rate for the given pattern.

12 Claims, 3 Drawing Sheets

AUTOMATIC ON-DRIVE SYNC-MARK SEARCH AND THRESHOLD ADJUSTMENT

PRIORITY

The present application claims the benefit under 35 U.S.C. §119(e) of U.S. Provisional Application Ser. No. 61/804,515, filed Mar. 22, 2013, which is incorporated herein by reference.

BACKGROUND OF THE INVENTION

Threshold-based sync-mark detection is a commonly used scheme in read channel systems. Detection is performed based on a Euclidean distance between a read-back signal and target sync-mark values. A threshold is set for sync-mark detection based on an anticipated distinction between a sync-mark and a preamble. Performance of sync-mark detection is determined by the sync-mark pattern and threshold, and is calculated based on analytical models or synthetic waveforms. It is important for the performance of a system to find a good sync-mark pattern and threshold for a particular read channel. However, theoretically optimal sync-mark patterns and thresholds may not correspond to real hard drives.

Consequently, it would be advantageous if an apparatus existed that is suitable for dynamically adjusting the sync-mark threshold base on real data.

SUMMARY OF THE INVENTION

Accordingly, the present invention is directed to a novel method and apparatus for dynamically adjusting the sync-mark threshold base on real data.

At least one embodiment of the present invention includes a processor to automatically adjust a threshold level for finding sync-marks. The processor determines all possible sync-mark patterns for a particular pattern length and analyzes each pattern with reference to real world data. The pattern with the largest distance gap is used. The threshold level is then adjusted dynamically to produce the lowest possible failure rate for the given pattern.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
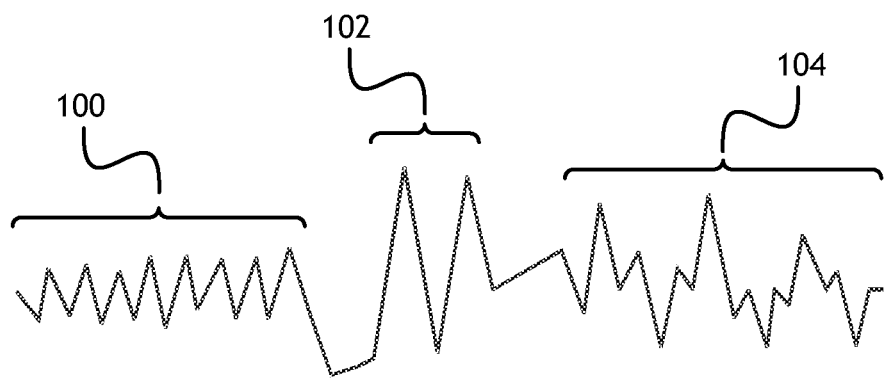
FIG. 1 shows a representation of a signal from a data store.

Referring to FIG. 1, a representation of a signal from a data store is shown. In one exemplary embodiment, a signal from a hard disc drive includes a sync-mark 102. The sync-mark 102 defines a boundary between a preamble 100 and useful data 104. In other words, the sync-mark 102 signals the beginning of useful data 104 in a read operation. In hard disk drive applications, a sync-mark 102 is a specially designed pattern, written to the media before the useful data 104. The sync-mark 102 is later used for frame synchronization.

During read operations, a sync-mark 102 is detected based on a threshold difference between a sync-mark pattern and a read-back signal. The threshold difference is defined by a Euclidean distance:

$$D = \sum_{i=0}^{L_{sm}-1} |x[i] - \hat{x}_{sm}[i]|^2$$

In this equation, x is a pre-processed read-back digital signal sequence and $\hat{x}_{sm}$ is an ideal pre-processed digital signal sequence corresponding to the sync-mark 102 pattern. Ideal pre-processed digital signal sequences are calculated by convolving a corresponding data pattern with characteristics of the estimated read channel. In at least one embodiment, the data pattern is a non-return-to-zero pattern common in digital communication. A sync-mark 102 is found when the distance D is less than some defined threshold.

For each read event, sync-mark 102 detection starts from the preamble 100 and proceeds until the sync-mark 102 is detected. In a quarter-rate system where the sync-mark 102 has a length $L_{sm}$, there are $$N = \frac{L_{sm}}{4} + 1$$

possible data patterns to compare with the sync-mark 102. Such a system has N possible Euclidean distances. For example, where a sync-mark 102 is defined to have sixteen bits, there are five possible Euclidean distances for a particular read channel and noise model.

In one exemplary embodiment of the present invention, where the distribution of possible Euclidean distances is roughly Gaussian, a sync-mark 102 detection failure rate is estimated by the gap between the average sync-mark 102 distance $\overline{D}_{sm}$ (nearly zero) and the average 2T preamble signal distance $\overline{D}_{2T}$.

Sync-mark 102 detection failure occurs when a false sync-mark is identified in a location other than the true sync-mark 102 location, such as in the preamble 100 (early detection) or no sync-mark 102 is detected before or at the actual sync-mark 102 location (miss detection). The detection threshold adjusts the balance between the two failure modes. A large distance gap $\overline{D}_{sm} - \overline{D}_{2T}$ is preferable because it allows a wide threshold range, thereby reducing the failure rate. Thresholds and sync-mark 102 patterns are read channel specific.

In real hard disk drives, the theoretically ideal sync-mark pattern with maximum Euclidean distance gap and optimal threshold may not provide good performance because real read channels are nonlinear and data-dependent, which can be statistically different from the models, and the read channel varies from drive to drive depending on media conditions.

Figure 2:
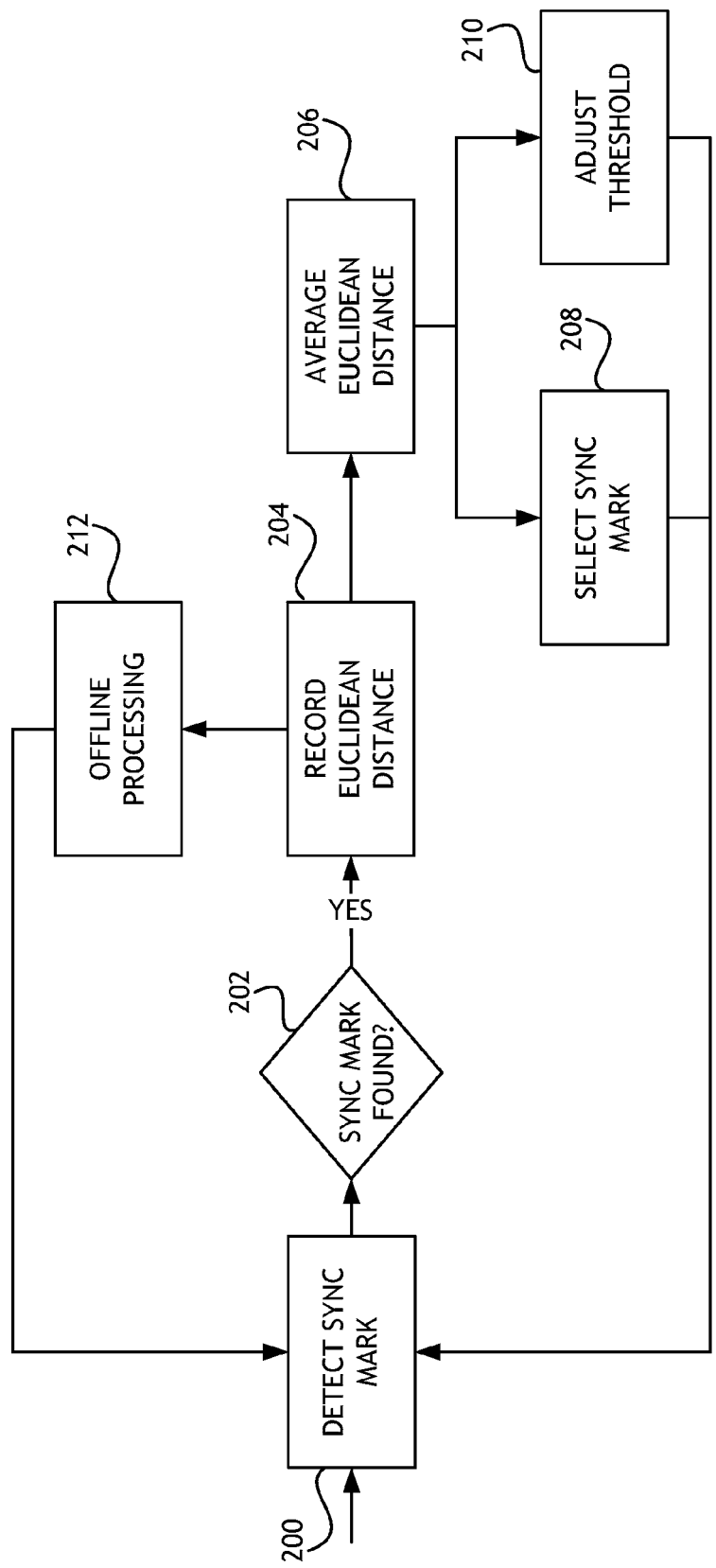
FIG. 2 shows a method for finding a sync-mark and adjusting a threshold for finding a sync-mark.

Referring to FIG. 2, a method for finding a sync-mark and adjusting a threshold for finding a sync-mark is shown. In at least one embodiment, the method for automatic on-drive sync-mark search and threshold adjustment allows each individual hard disk drive to find a sync-mark pattern and adjust a detection threshold based on actual data patterns. A processing element reads data input to detect 200 a sync-mark. In one embodiment, the processing element begins with a predetermined sync-mark pattern and detection threshold. In another embodiment, offline processing 212 determines an initial sync-mark pattern and detection threshold based on theoretical parameters and data. The processing element continues to process data input until a sync-mark is detected 200.

When a processing element determines 202 that a sync-mark is detected 200, the Euclidean distance of the detected sync-mark is recorded 204. Distance values are maintained in a buffer; in at least one embodiment the buffer is of size N according to the bit-length of the sync-mark, which can keep track of the previous N distances. The N values stored in the buffer correspond to the instantaneous distances between the N possible signal sequences and the target sync-mark sequence: $D_{2T}, \ldots, \overline{D}_{sm}$. These values are used to compute 206 average distances.

In at least one embodiment of the present invention, a minimum gap between the detected distance and the sync-mark detection threshold is used to quantify the quality of a detection event. If the gap is smaller than the minimum gap, the Euclidean distance will not be recorded even if a sync-mark is detected 200.

In at least one embodiment of the present invention, the Euclidean distances are used for offline processing 212 to produce more precise sync-mark pattern selection and threshold adjustment.

Based on the instantaneous Euclidean distance in the buffer, a processor computes 206 an average Euclidean distances for preamble signals $\overline{D}_{2T}[n]$ and sync-mark signals $\overline{D}_{sm}[n]$. In one embodiment, a two-tap low-pass filter is used to compute the average values:

$$\overline{D}_i[n] = (1-\alpha)\overline{D}_i[n-1] + \alpha D_i[n]$$

where $\alpha \in [0,1]$ is a small value depending on a channel variation parameter.

In at least one embodiment of the present invention, an updated sync-mark is selected 208 based on the average Euclidean distances for preamble signals $\overline{D}_{2T}[n]$ and sync-mark signals $\overline{D}_{sm}[n]$. A processor stores a sync-mark pattern and corresponding average Euclidean distance gap. In one embodiment, a default sync-mark pattern and distance gap value is selected 208. For each new sync-mark pattern, after a predetermined number of data are processed, a processor reads the average distances for preamble signals $\overline{D}_{2T}[n]$ and sync-mark signals $\overline{D}_{sm}[n]$ and computes a new distance gap:

$$\overline{G} = \overline{D}_{2T}[n] - \overline{D}_{sm}[n]$$

The $\overline{G}$ value is compared with the current distance gap. If the new sync-mark pattern has a larger $\overline{G}$ than the current sync-mark pattern, the sync-mark pattern field and the distance gap field are updated. Finally, the sync-mark pattern with the maximum distance gap is stored and used for future sync-mark detection 200. In one embodiment of the present invention, all valid sync-mark patterns defined by the sync-mark length $L_{sm}$ are processed and the one with the largest distance gap for the actual hard disk drive is selected 208.

For any given sync-mark pattern, a threshold is determined 210 according to the average distances for preamble signals $\overline{D}_{2T}[n]$ and sync-mark signals $\overline{D}_{sm}[n]$. In at least one embodiment, a threshold $D_{th}$ is computed by:

$$D_{th}[n] = \beta \overline{D}_{2T}[n] + (1-\beta) \overline{D}_{sm}[n]$$

where $\beta \in [0,1]$ is a system parameter. The system parameter $\beta$ adjusts the balance between miss detection rate and early detection rate. Because values of preamble signals $\overline{D}_{2T}[n]$ and sync-mark signals $\overline{D}_{sm}[n]$ are specific to the channel, the threshold $D_{th}[n]$ is automatically adjusted 210 in real time. In one embodiment, the threshold $D_{th}[n]$ is stored and used for future sync-mark detection 200.

A processor executing methods according to embodiments of the present invention searches for a sync-mark pattern with the largest distance gap for a particular hard disk drive according to certain sync-mark parameters. The processor also adjusts the detection threshold in real time.

In another embodiment of the present invention, an offline processor is used for slower offline processing 212. The offline processor receives the instantaneous Euclidean distances from the distance buffer as they are recorded 204, or at some later time. In at least one embodiment, a sync-mark failure rate is computed for any given threshold based on the real Euclidean distance statistics. By analyzing all sync-mark patterns and thresholds within certain criteria, the sync-mark pattern and threshold that achieves the smallest failure rate can be selected.

Figure 3:
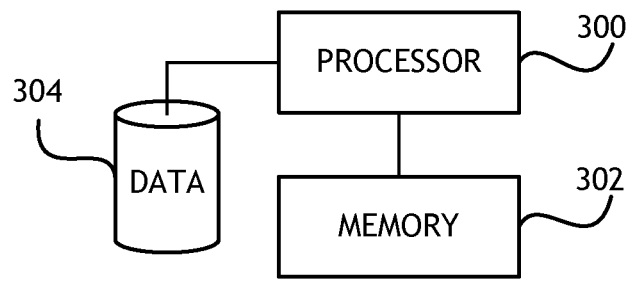
FIG. 3 shows a block diagram of a drive system for implementing embodiments of the present invention.

Referring to FIG. 3, a block diagram of a drive system for implementing embodiments of the present invention is shown. In at least one embodiment of the present invention, a system such as a hard disk drive includes a processor 300, memory 302 connected to the processor 300 and one or more data storage elements 304. The processor 300 is configured to read data from the one or more data storage elements 304 and detect a sync-mark in the data stream.

In at least one embodiment of the present invention, the processor 300 detects a sync-mark based on a threshold difference between an initial sync-mark pattern and a read-back signal. The threshold difference is defined by a Euclidean distance:

$$D = \sum_{i=0}^{L_{sm}-1} |x[i] - \hat{x}_{sm}[i]|^2$$

In this equation, x is a pre-processed read-back analog signal sequence and $\hat{x}_{sm}$ is an ideal pre-processed analog signal sequence corresponding to the sync-mark pattern. Ideal pre-processed analog signal sequences are calculated by convolving a corresponding data pattern with characteristics of the estimated read channel. In at least one embodiment, the data pattern is a non-return-to-zero pattern common in digital communication. The processor 300 detects a sync-mark when the distance D is less than some defined threshold.

For each read event, the processor 300 begins sync-mark detection in the data stream by reading a preamble and proceeding until the sync-mark is detected. In a quarter-rate system where the sync-mark has a length $L_{sm}$, there are $$N = \frac{L_{sm}}{4} + 1$$

possible data patterns to compare with the sync-mark pattern. Such a system has N possible Euclidean distances. For example, where a sync-mark is defined to have sixteen bits, there are five possible Euclidean distances for a particular read channel and noise model.

In one exemplary embodiment of the present invention, where the distribution of possible Euclidean distances is roughly Gaussian, a sync-mark detection failure rate is estimated by the gap between the average sync-mark distance $\overline{D}_{sm}$ (nearly zero) and the average 2T preamble signal distance $\overline{D}_{2T}$. A large distance gap $\overline{D}_{sm}$-$\overline{D}_{2T}$ is preferable because it allows a wide threshold range. Thresholds and sync-mark patterns are read channel specific.

When the processor 300 determines that a sync-mark is detected, the Euclidean distance of the detected sync-mark is recorded in the memory 302. The values stored in the memory 302 correspond to the instantaneous distances between the possible signal sequences and the target sync-mark sequence: $D_{2T}, \ldots, \overline{D}_{sm}$. The processor 300 uses these values to compute average distances.

In at least one embodiment of the present invention, the processor 300 uses a minimum gap between the detected distance and the sync-mark detection threshold to quantify the quality of a detection event. If the gap is smaller than the minimum gap, the processor 300 does not record the Euclidean distance even if a sync-mark is detected 200.

Based on the instantaneous Euclidean distance in the memory 302, the processor 300 computes an average Euclidean distances for preamble signals $\overline{D}_{2T}[n]$ and sync-mark signals $\overline{D}_{sm}[n]$. In one embodiment, a two-tap low-pass filter is used to compute the average values:

$$\overline{D}_i[n]=(1-\alpha)\overline{D}_i[n-1]+\alpha D_i[n]$$

where $\alpha \in [0,1]$ is a small value depending on a channel variation parameter.

In at least one embodiment of the present invention, the processor 300 selects an updated sync-mark based on the average Euclidean distances for preamble signals $\overline{D}_{2T}[n]$ and sync-mark signals $\overline{D}_{sm}[n]$. The processor 300 stores a sync-mark pattern and corresponding average Euclidean distance gap in the memory 302. In one embodiment, the processor 300 selects a default sync-mark pattern and distance gap value. For each new sync-mark pattern, after a predetermined number of data are processed, the processor 300 reads the average distances for preamble signals $\overline{D}_{2T}[n]$ and sync-mark signals $\overline{D}_{sm}[n]$ and computes a new distance gap:

$$\overline{G}=\overline{D}_{2T}[n]-\overline{D}_{sm}[n]$$

The processor 300 compares the $\overline{G}$ value with the current distance gap. If the new sync-mark pattern has a larger $\overline{G}$ than the current sync-mark pattern, the processor 300 updates the sync-mark pattern field and the distance gap field. Finally, the processor 300 stores the sync-mark pattern with the maximum distance gap and uses that sync-mark pattern for future sync-mark detection. In one embodiment of the present invention, all valid sync-mark patterns defined by the sync-mark length $L_{sm}$ are processed and the one with the largest distance gap for the actual hard disk drive is selected.

For any given sync-mark pattern, the processor 300 determines a threshold according to the average distances for preamble signals $\overline{D}_{2T}[n]$ and sync-mark signals $\overline{D}_{sm}[n]$. In at least one embodiment, the processor 300 computes a threshold $D_{th}$:

$$D_{th}[n]=\beta D_{2T}[n]+(1-\beta)\overline{D}_{sm}[n]$$

where $\beta \in [0,1]$ is a system parameter. The system parameter $\beta$ adjusts the balance between miss detection rate and early detection rate. Because values of preamble signals $\overline{D}_{2T}[n]$ and sync-mark signals $\overline{D}_{sm}[n]$ are specific to the channel, the processor 300 automatically adjusts the threshold $D_{th}[n]$ in real time. In one embodiment, the processor 300 stores the threshold $D_{th}[n]$ in the memory 302 and uses the threshold for future sync-mark detection.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A hard disk drive comprising:
   a processor;
   memory connected to the processor, configured to store a reference sync-mark and a reference distance threshold;
   a data storage element connected to the processor; and
   computer executable program code configured to execute on the processor,
   wherein the computer executable program code is configured to:
      read a data stream from the data storage element;
      detect a first sync-mark in the data stream, the first sync-mark having one or more characteristics substantially similar to one or more characteristics of the reference sync-mark based on the reference distance threshold;
      detect a second sync-mark in the data stream, the second sync-mark having one or more characteristics substantially similar to one or more characteristics of the reference sync-mark based on the reference distance threshold;
      update the reference distance threshold;
      determine a Euclidean distance associated with the first sync-mark;
      determine a Euclidean distance associated with the second sync-mark;
      determine an average Euclidean distance based on the first sync-mark and the second sync-mark;
      determine an estimated early detection rate associated with a new distance threshold based on the average Euclidean distance; and
      determine an estimated miss detection rate associated with the new distance threshold based on the average Euclidean distance.

2. The hard disk drive of claim 1, wherein the computer executable program code is further configured to:
   store the Euclidean distance associated with the first sync-mark in the memory.

3. The hard disk drive of claim 2, wherein the computer executable program code is further configured to:
   store the Euclidean distance associated with the second sync-mark in the memory.

4. The hard disk drive of claim 1, wherein the computer executable program code is further configured to:
   select a new sync-mark based on the average Euclidean distance; and
   update the reference sync-mark to the new sync-mark.

5. The hard disk drive of claim 1, wherein the computer executable program code is further configured to:
   determine a Euclidean distance for two or more potential sync-marks, each of the two or more potential sync-marks associated with a sync-mark length;

determine a distance gap for each of the two or more potential sync-marks;
select a new sync-mark from the two or more potential sync-marks based on the distance gaps; and
update the reference sync-mark to the new sync-mark.

6. A method for detecting sync-marks in a data storage system comprising:
reading a data stream from a data storage element;
detecting a first sync-mark in the data stream, the first sync-mark having one or more characteristics substantially similar to one or more characteristics of a reference sync-mark based on a reference distance threshold;
determining a Euclidean distance associated with the first sync-mark;
detecting a second sync-mark in the data stream, the second sync-mark having one or more characteristics substantially similar to one or more characteristics of the reference sync-mark based on the reference distance threshold;
determining a Euclidean distance associated with the second sync-mark;
determining an average Euclidean distance based on the first sync-mark and the second sync-mark;
determining an estimated early detection rate associated with the new distance threshold based on the average Euclidean distance;
determining an estimated miss detection rate associated with the new distance threshold based on the average Euclidean distance;
calculating a new distance threshold; and
updating the reference distance threshold to the new distance threshold.

7. The method of claim 6, further comprising:
selecting a new sync-mark based on the average Euclidean distance; and
updating the reference sync-mark to the new sync-mark.

8. The method of claim 6, further comprising:
determining a Euclidean distance for two or more potential sync-marks, each of the two or more potential sync-marks associated with a sync-mark length;
determining a distance gap for each of the two or more potential sync-marks;
selecting a new sync-mark from the two or more potential sync-marks based on the distance gaps; and
updating the reference sync-mark to the new sync-mark.

9. A computer apparatus comprising:
a processor;
memory connected to the processor; and
computer executable program code configured to execute on the processor,
wherein the computer executable program code is configured to:
receive one or more Euclidean distances corresponding to one or more sync-mark patterns;
receive one or more Euclidean distances corresponding to one or more read-back sequences;
compute one or more distance gaps corresponding to at least one of the one or more sync-mark patterns and at least one of the one or more read-back sequences;
determine an average sync-mark Euclidean distance based on the one or more Euclidean distances corresponding to one or more sync-mark patterns;
determine an estimated early detection rate associated with a new distance threshold based on the average sync-mark Euclidean distance;
determine an estimated miss detection rate associated with the new distance threshold based on the average sync-mark Euclidean distance; and
select a sync-mark pattern for use by a hard disk drive.

10. The apparatus of claim 9, wherein the computer executable program code is further configured to determine an average read-back Euclidean distance based on the one or more Euclidean distances corresponding to one or more read-back sequences.

11. The apparatus of claim 10, wherein the computer executable program code is further configured to:
determine an estimated early detection rate associated with a new distance threshold based on the average sync-mark Euclidean distance and average read-back Euclidean distance; and
determine an estimated miss detection rate associated with the new distance threshold based on the average sync-mark Euclidean distance and average read-back Euclidean distance.

12. The apparatus of claim 9, wherein the computer executable program code is further configured to:
select a new sync-mark based on the average sync-mark Euclidean distance; and
update the reference sync-mark to the new sync-mark.

* * * * *